United States Patent
Takeshima et al.

[15] 3,655,470
[45] Apr. 11, 1972

[54] PROCESS FOR THE PRODUCTION OF A FOAMED THERMOPLASTIC RESIN SHEET

[72] Inventors: Akio Takeshima; Tadashi Ueyama; Akinori Ohki; Tetsuo Mori, all of Minato-ku, Nagoya, Japan

[73] Assignee: Toa Gosei Chemical Industry Co., Ltd., Tokyo, Japan

[22] Filed: Dec. 16, 1968

[21] Appl. No.: 784,001

[30] Foreign Application Priority Data

Mar. 29, 1969 Japan...................................44/24050

[52] U.S. Cl....................................156/79, 156/205, 264/54
[51] Int. Cl........................................................B32b 5/18
[58] Field of Search.................156/78, 79, 205; 264/210, 54
[56] References Cited

UNITED STATES PATENTS 3,231,439  1/1966  Voelker.................................156/79
3,433,700  3/1969  Migdol et al..........................156/79 X Primary Examiner—Reuben Epstein
Assistant Examiner—S. R. Hellman
Attorney—Sughrue, Rothwell, Mion, Zinn and Macpeak

[57] ABSTRACT

Process for continuously producing a foam sheet by heating a continuous sheet of a soft thermoplastic synthetic resin, said sheet prepared by a calendering process, which contains a chemical foaming agent at a temperature lower than the decomposition temperature of said chemical foaming agent eliminating the internal stress of said sheet elongating a corrugation formed on the sheet during said heating in the direction of the width thereof, and then heating at a temperature higher than the decomposition temperature of said chemical foaming agent to foam said sheet.

6 Claims, 5 Drawing Figures

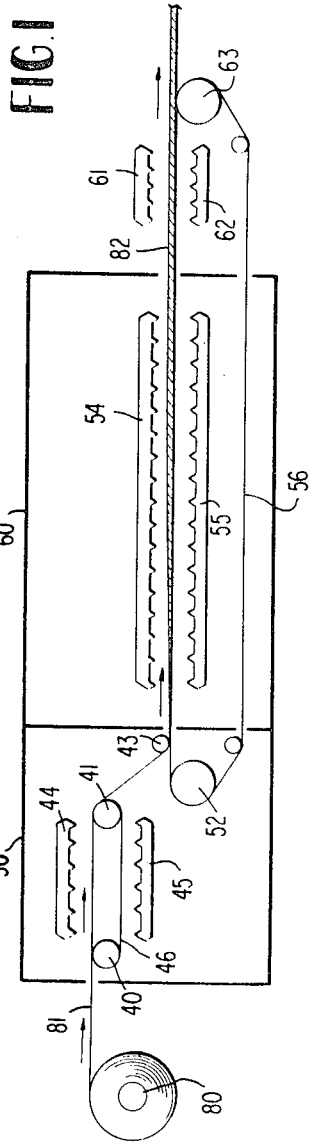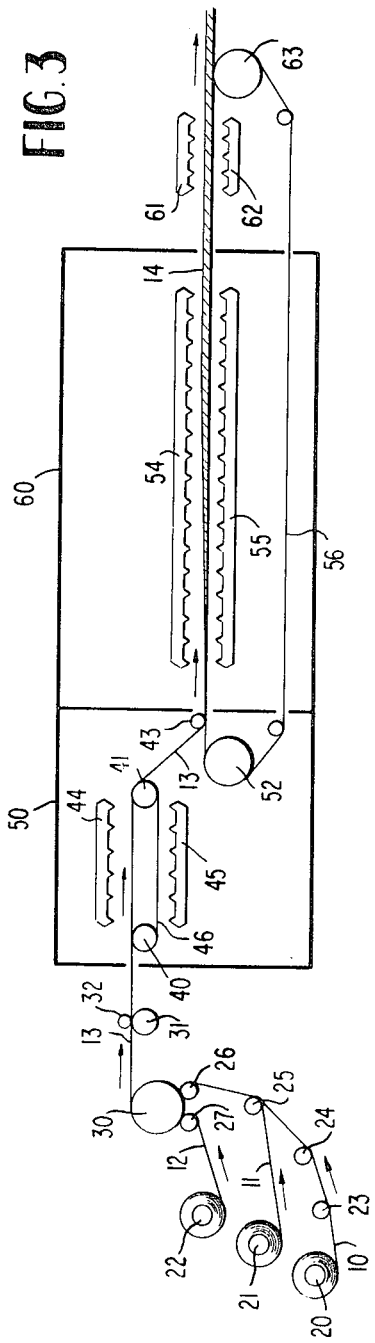

PROCESS FOR THE PRODUCTION OF A FOAMED THERMOPLASTIC RESIN SHEET

BACKGROUND OF THE INVENTION

1. Field of the Invention

This invention relates to a process for continuously producing a foam sheet of soft thermoplastic synthetic resin, in particular, a soft vinyl chloride type synthetic resin.

2. Description of the Prior Art

In attempts to produce foam sheets of soft thermoplastic synthetic resins, a plastisol resin has been foamed by the use of a chemical foaming agent. This process consists of pouring a plastisol containing a chemical foaming agent onto a belt continuously moving and then feeding the belt to a foaming chamber where the temperature is kept higher than the decomposition temperature of the chemical foaming agent.

However, such a process is not satisfactory since the raw material is relatively expensive and it is difficult to control the size of the final product.

In another process for producing a foam sheet of a soft thermoplastic synthetic resin from a thermoplastic synthetic resin, a composition of the resin powder and additives, such as a chemical foaming agent, a stabilizer, plasticizer, etc. is kneaded, formed into a sheet by a calender or extrusion method and heated to a temperature higher than the decomposition temperature of the chemical foaming agent whereby a foam sheet of soft plastic synthetic resin is obtained.

This process is applicable to the foaming of a sheet of a soft thermoplastic synthetic resin backed with a cloth or paper, but gives unfavorable results in the foaming of a sheet free from such as base cloth, because a film or sheet made by a calender or extrusion method has complicated internal stresses, and causes expansion and contraction during foaming by heating due to these internal stresses. The thicker the sheet to be foamed is, or the larger the foaming ratio thereof, the greater such a corrugating tendency is.

SUMMARY OF THE INVENTION

The present invention provides a process for continuously producing a foam sheet of soft thermoplastic synthetic resin, in particular, a soft vinyl chloride-type synthetic resin.

The process comprises heating a continuous sheet of a soft thermoplastic resin which contains at least a chemical foaming agent at a temperature lower than the decomposition temperature of the chemical foaming agent. This temperature must be sufficient to cause corrugation on the sheet due to internal stresses which are developed on a moving endless belt as it is being heated, thereby causing corrugation on the surface of the sheet while it is in a support-free state. The corrugated sheet is elongated in the direction of its width, heated to a temperature higher than the decomposition temperature of the foaming agent, and thereby foamed.

It is an object of the invention to provide a process for continuously producing a wrinkle-free foam sheet from a soft thermoplastic synthetic resin sheet obtained by a calender or extrusion method, in particular a soft vinyl chloride type synthetic resin sheet, the process proceeding without the use of a base cloth.

It is another object of the invention to provide a foam sheet of a soft thermoplastic synthetic resin having a gas non-permeable layer of thermoplastic synthetic resin on the surface which is suitable for secondary working by vacuum molding.

These objects and other features of the invention will become apparent from the following description and drawings:

BRIEF DESCRIPTION OF THE DRAWINGS

FIG. 1 is one embodiment of the apparatus which may be utilized to practice the present invention;

FIG. 2 is a soft foam thermoplastic sheet formed by the process of the present invention;

FIG. 3 is a second embodiment of an apparatus which may be utilized to practice the present invention;

FIG. 4 is a laminated foam sheet produced by the process of the present invention; and FIG. 5 is one embodiment of the means which may be utilized to corrugate the sheet of the present invention in the direction of its width.

DETAILED DESCRIPTION OF THE INVENTION

The present invention, whereby the foregoing objects can be accomplished, is carried out by heating a continuous sheet of a soft thermoplastic synthetic resin containing a chemical foaming agent at a temperature lower than the decomposition temperature of the chemical foaming agent contained in said sheet, but sufficient to cause corrugation on the sheet due to the internal stress which is developed on amoving substrate, preferably an endless belt, releasing said sheet from the endless belt as it is heated, causing corrugation on the surface in a support-free state, elongating the corrugated sheet in the direction of its width, transferring the sheet to another moving endless belt and then heating at a temperature higher than the decomposition temperature of the foaming agent on said belt whereby said sheet is foamed.

Moreover, the invention can most favorably be carried out when directed to producing a multi-layer foam sheet having a surface layer of gas impermeable thermoplastic synthetic resin, suitable for secondary working by vacuum molding, rather than the mere production of a sheet of only a foamed layer.

A resin sheet for producing the foam layer, comprising a resin, a plasticizer, a stabilizer, a chemical foaming agent, a filler and pigments, used in the invention, can be produced, for example, by adding to a powdered homopolymer of vinyl chloride a plasticizer such as di(2-ethylhexyl) phthalate, butyl benzyl phthalate, epoxy soybean oil or tricresyl phosphate, a stabilizer such as tribasic lead sulfate, settling lead silicate, cadmium sterate, barium stearate, a liquid organic metal compound or mixtures, a chemical foaming agent such as azo dicarbonamide or dinitropentamethylenetetramine; a filler such as calcium carbonate, titanium oxide or silicic anhydride; and various pigments. This is then mixed or kneaded by means of a mixer, such as a Henschel mixer, being heated and formed into a sheet by a calender roll.

The thickness of this sheet is preferably within a range of 0.3–0.6 mm. In the case of producing a thick foam sheet, it is desirable to use a plurality of superposed sheets, rather than one thick sheet.

The amounts of the various additives to vinyl chloride resin in the production of this sheet are: plasticizer 20–125 parts by weight; stabilizer 2–6 parts by weight; foaming agent about 0.5–7 parts by weight, depending upon a predetermined foaming ratio; filler 0–50 parts by weight; pigment small amounts as used in the art, if necessary, per 100 parts by weight of vinyl chloride resin.

When a surface layer of a gas impermeable soft thermoplastic synthetic resin is formed on the foam sheet in accordance with the process of the invention, the resin sheet for the surface layer can be prepared from a composition obtained by removing the chemical foaming agent and reducing somewhat the plasticizer and stabilizer from the resin composition for the foamed layer.

Examples of a vinyl chloride resin sheet for use as the foamed layer and the vinyl chloride resin sheet for the surface layer, suitable for practice of the process of the invention, are shown in the following:

| Vinyl chloride resin sheet for foamed layer | parts by weight |
|---|---|
| Vinyl chloride resin (average degree of polymerization 1100) | 100 |
| Plasticizer (di(2-ethylhexyl)phthalate) | 80 |
| Stabilizer (Cd-Ba-Laurate(Ba/Cd=3) 2.6, organic complex of Cd-Ba-Zn 1.0, settling lead silicate 1.0) | 4.6 |
| Filler (CaCO₃) | 20 |
| Chemical foaming agent (azo dicarbonamide) | 5.7 |

The above described resin, plasticizer, stabilizer, filler and chemical foaming agent are mixed by Henschel mixer and subjected to a calender roll to obtain a soft sheet.

The invention will now be illustrated in detail in the accompanying drawings, in which FIG. 1 is an elevation of a preferred form of the apparatus wherein a soft vinyl chloride resin sheet of 1100 mm. width and 0.6 mm thickness, compounded and formed into a sheet by the foregoing method, is converted into a foam sheet by the process of the present invention.

FIG. 2 is a vertical cross sectional view of a soft vinyl chloride foam sheet obtained by this apparatus.

FIG. 3 is an elevation of another embodiment of apparatus with which the invention can be carried out.

FIG. 4 is a vertical cross sectional view of a soft vinyl chloride foam sheet obtained by this apparatus.

Referring to FIG. 1, non-foamed sheet 81 containing a chemical foaming agent wound around roll 80 enters a first chamber 50 having a length of 3.5 m where it is placed onto the first conveyer net 46, formed of conveyer drums 40 and 41 and an endless belt and driven in the direction of the arrow at a rate of 3 m/min. The temperature of first chamber 50 is maintained at a temperature lower than the foaming temperature of sheet 81, but sufficient to moderate the internal stress thereof (about 170°) by means of heaters 44, and 45 placed at the upper and lower sides of conveyer net 46. The sheet on conveyer net 46 begins to expand and contract under heating due to the internal stress given thereto when it is formed by a calender roll, and there will be produced a corrugation in the longitudinal direction because the sheet itself is stretched somewhat in its running direction.

The heated sheet is then forwarded to a second conveyor (endless net 56) formed of conveyer drum 52 arranged under the end of first conveyor net 46 and conveyer drum 63 behind second chamber 60, having a length of 8 m following the first chamber. In this case, since the sheet is lowered in the space of the first chamber without any support surface, it expands and contracts freely in this space. Consequently, the sheet is corrugated exclusively in the longitudinal direction of the sheet, since it is "strained" to some extent in the running direction of the sheet.

The corrugated sheet is then transferred onto the second conveyor net 56 directly after it is lightly pressed by press roll 43 to stretch it in the direction of its width, thereby somewhat modifying the corrugation Non-rotating press roll 43 which modifies the corrugation in this embodiment is provided with spiral grooves directed in opposite directions to the left and right from the center of the roll. Specifically, in this embodiment roll 43 has a structure such that the sheet in contact with this roll is stretched in the direction of width (See FIG. 5 for a drawing of this roll.)

Stretching of the corrugated sheet in the direction of width is not necessarily effected by the above mentioned spiral roll, but a lug arrangement for cloths may be used, this apparatus being called a "cloth guider."

By this means, strains will be eliminated from the sheet, the sheet running in the direction of the arrow on conveyor net 56. The sheet enters second chamber 60.

Second chamber 60 is provided with heaters 54, 55 above and under the conveyer net 56 so as to maintain the inside thereof at a temperature suitable for foaming the sheet. In this second chamber, the sheet is heated at a temperature higher than the decomposition temperature of the chemical foaming agent, for instance, 200°C. and is foamed to give foamed sheet 82. In this case, there is no corrugation or unevenness on the foamed sheet thus resulting, since expansion and contraction were completed while the sheet was being transferred from the first conveyor net 46 to the second conveyor net 56 as hereinbefore illustrated.

Foamed sheet 82 leaving second chamber 60 is cooled by air flow coolers 61 and 62 to provide a foam sheet of soft vinyl chloride having a thickness of 3.5 mm. and a fine and uniform foam structure with no wrinkles on the surface. In this operation, the velocity ratio of first conveyer net and second conveyor net is preferably controlled, depending upon the degree of expansion and contraction of the sheet. When producing the foregoing vinyl chloride foam sheet, it is desirable to adjust the velocity ratio of the conveyor nets to approximately 1 : 1.05, the velocity of the second conveyor net being somewhat higher than that of the first conveyor net, in order to completely remove corrugation of the sheet.

In the apparatus of FIG. 3, a non-foamed soft vinyl chloride resin sheet containing a foaming agent and having a width of 1100 mm and a thickness of 0.6 mm, compounded and formed by the foregoing method, is sandwiched as an intermediate layer between a foaming agent-free vinyl chloride resin sheet having a width of 1100 mm and a thickness of 0.5 mm, and 0.15 mm compounded and formed similarly, as a surface layer and as a back layer. These sheets are laminated into one body, and the intermediate layer is subjected to foaming. Thus, a foam sheet of soft vinyl chloride resin is obtained with a vertical cross sectional view as shown in FIG. 4.

Referring to FIG. 3, soft vinyl chloride resin sheet 10 containing no foaming agent and having a thickness of 0.15 mm, wound around roll 20; non-foamed soft vinyl chloride resin sheet 11 containing azo dicarbonamide as a foaming agent and having a thickness of 0.6 mm, wound around roll 21; and soft vinyl chloride resin sheet 12 containing no foaming agent and having a thickness of 0.5 mm, wound around roll 22, are laminated by heated laminate rolls 26, 27 and 30 via support rolls 23, 24 and 25 to form one sheet 13. The laminate is compressed by pinch rolls 31 and 32, passed through a first chamber and a second chamber where sheet 13 is subjected to expansion and contraction, and heated and foamed to give foamed sheet 14 respectively. The laminate is then cooled, said first chamber and second chamber being similar to those of FIG. 1. Thus, a laminate sheet of about 4 mm in total thickness, with a surface layer and a back layer of a non-foamed sheet and an intermediate layer of a very fine and uniform foam structure, is obtained. No corrugation and unevenness could be found therein.

While the above has been described in connection with the preferred embodiments of this invention, it will be obvious to those skilled in the art that various changes and modifications may be made therein without departing from the scope of the invention, and it is intended therefore, to encompass within the appended claims, all such changes and modifications as falling with the true spirit and scope of this invention.

What is claimed is:

1. A process for continuously producing a foam sheet from a continuous sheet of soft thermoplastic synthetic resin obtained by the calender or extrusion method, which contains a chemical foaming agent, which comprises:
    a. heating said continuous sheet of soft thermoplastic resin on a moving endless belt at a temperature lower than the decomposition temperature of the chemical foaming agent contained therein, thus causing corrugation of said sheet,
    b. releasing the corrugated sheet from the moving support as it is being heated on to a second moving support directly arranged under the end of said first moving support, so as to permit the said corrugated sheet to expand and contract freely in the space maintained between the two moving supports,
    c. elongating the corrugated sheet in the direction of its width, and,
    d. transferring the sheet to a second moving support and heating the sheet to a temperature higher than the decomposition temperature of the foaming agent whereby said sheet is foamed.

2. A process as in claim 1 wherein said moving supports are endless belts.

3. As process as in claim 1 wherein the soft thermoplastic synthetic resin sheet is a vinyl chloride type synthetic resin.

4. The process of claim 1 which further comprises laminating at least one sheet of a soft thermoplastic synthetic resin to the soft thermoplastic synthetic resin sheet which contains a chemical foaming agent.

5. The process of claim 1 wherein said soft thermoplastic synthetic resin sheet has a thickness of within the range of from about 0.3 to about 0.6 mm.

6. The process of claim 1 wherein said moving supports are both endless belts and the velocity ratio of said first endless belt is approximately 1: 1.05.

* * * * *